UNITED STATES PATENT OFFICE

FRIEDRICH BOEDECKER, OF BERLIN-DAHLEM, GERMANY, ASSIGNOR TO THE FIRM J. D. RIEDEL-E. DE HAEN AKTIENGESELLSCHAFT, OF BERLIN-BRITZ, GERMANY

MANUFACTURE OF AROMATIC HYDROXY ALDEHYDES

No Drawing. Application filed November 28, 1927, Serial No. 236,357, and in Germany February 17, 1927.

This invention relates to the manufacture of aromatic hydroxy-aldehydes, more especially of vanillin.

It has been proposed to oxidize i-eugenol, in the presence of caustic alkali, with nitrobenzene to vanillin, the calculated amount of 2 molecules of nitrobenzene being employed per each molecule of i-eugenol, according to the equation

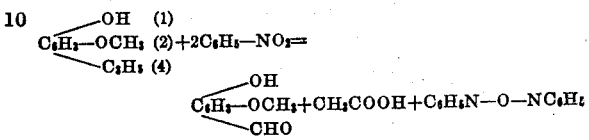

see French Patent No. 510,694, published December 9, 1920. The attempts to carry this process into practice have failed, see Chemical Trade Journal & Chemical Engineer, vol. 77, page 181.

In the U. S. patents to Bots Nos. 1,643,804 and 1,643,805, issued September 27, 1927 it is stated that "for the success of the process it is essential that the oxidation should be carried on in the presence of a free alkali and in the presence of aniline which, to all appearances acts as a diluent". The presence of an excess of free alkali being disclosed in the above-cited French specification, the only novelty in Bots' process consists in the presence of aniline.

Now I have discovered that with simpler means better yields are obtained than before by treating i-eugenol, preferably in the presence of a free alkali, with an excess of nitrobenzene. This excess of nitrobenzene serves for effecting the dissolution of the phenolate whereby a thorough stirring of the reacting mass and a uniform course of the reaction is warranted. For starting the reaction which is a more or less vigorous one it suffices to heat the mixture to an elevated temperature. If it is desired to further moderate the reaction, the excess of the nitrobenzene employed may be further increased.

It is not necessary to employ the alkali metal salts to be oxidized in an absolutely anhydrous state; the presence of some water is even recommendable. Therefore preferably the products either freed from an excess of water by centrifuging or pressing or obtained in the presence of little water are directly subjected to the described reaction. Most favorable results are obtained by working at temperatures between 115 and 125° C. This can easily be realized by introducing the product to be oxidized—for instance, the moist alkali metal salt of i-eugenol containing an excess of alkali—into an excess of nitrobenzene. The nitrobenzene which participates in the reaction is for the most part transformed to aniline.

The resulting hydroxy-aldehyde may be separated in the well-known manner, after the removal of the excess of nitrobenzene and aniline.

The same reaction may be applied to other o- and p-propenyl-hydroxy-benzenes. For instance, 1-hydroxy-2-ethoxy-4-propenyl-benzene yields the valuable next homologue of vanillin:

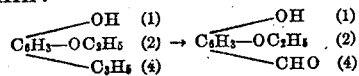

Also more intricate derivatives of 1, 2-dihydroxy-4-propenyl-benzene, for instance, the 2-methoxy-methyl ether of 1, 2-dihydroxy-4-propenyl-benzene, yield the corresponding aldehydes:

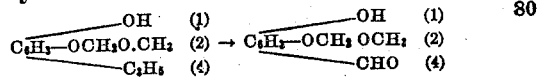

Other aromatic nitro compounds may likewise be used; for instance, when employing an excess of nitrotoluene, excellent yields are obtained.

On further examination I have discovered that the phenols containing the propenyl group in meta-position cannot be oxidized at all by means of nitro compounds even when employing higher temperatures than with the para-compounds for the purpose in question. Therefore when treating mixtures of mono-etherified propenyl-1-pyrocatechine 3, 4-ether, only the isomer carrying a free hydroxyl in para-position to the propenyl group is oxidized. Hereby it becomes possible to further simplify the process of producing vanillin (or its higher homologues)

as described in my copending application Ser. No. 146,850.

For instance, the mixture of isomeric propenyl-monomethyl-pyrocatechine ethers obtained by this process may be split up without further effort into a mixture of vanillin and i-chavibetol from which the vanillin may be withdrawn by means of a bisulfite:

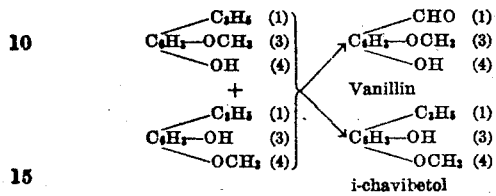

Another method consists in separating the main quantity of the i-chavibetol according to the process described in my copending application Ser. No. 146,850 and then subjecting the filtrate therefrom to the oxidizing process. In the said copending application I have stated that this filtrate contains, besides i-eugenol and small quantities of i-chavibetol, still further isomeric propenyl-pyrocatechine ethers. Now I have ascertained that in the present oxidizing process one of these isomers is converted to vanillin and the other for the greater part to i-chavibetol. In any case, also under these conditions, a mixture almost wholly consisting of vanillin and i-chavibetol is obtained after the oxidation has been completed.

*Examples*

1. 60 grams of nitrobenzene are poured over with 28 grams of a mixture of 32.8 grams of i-eugenol and 115 c. c. of a 30% caustic potash solution, dried in vacuo at 80° C., and the whole is heated in an oil bath up to about 150° C. As soon as the beginning of the reaction is indicated by effervescence the oil bath is removed and the reaction allowed to finish by itself. Then the reaction product forming a needle-shaped sludge of crystals is absorbed in water and shaken with benzene to remove the aniline and the excess of nitrobenzene. The aqueous alkaline liquor is acidulated, the precipitating product absorbed in benzene and the vanillin extracted from the benzene solution with a bisulfite solution. The latter is decomposed by acidulating and the crystallized vanillin filtered off by suction, washed and dried. It is obtained in pure form by distillation and recrystallization.

2. 500 grams of the m-ether of the 1, 2-dihydroxy-4-propenyl benzene are crushed with 530 grams of powdered caustic soda with the addition of 100 cc. of water. The resulting sodium salt which needs no drying is thus obtained as an easily pulverized sandy product. For oxidation it is introduced into 1.8 kilograms of nitrobenzene, the temperature being kept at 120-125° C. for about 4 hours. Then the most part of the excess of nitrobenzene is blown off by steam together with the aniline and azobenzene formed, the residue diluted with water and the alkaline solution shaken with benzene to remove the remainders of nitrobenzene and the products from the reduction of the latter. Hereupon the solution is acidified with hydrochloric acid, the precipitating aldehyde is absorbed with benzene and the aqueous layer twice extracted with benzene. The united benzene solutions are concentrated by evaporation, if required, and then exhausted with a bisulfite solution. By decomposing the latter with hydrochloric acid, about 400 grams of the m-ethyl ether of protocatechuic aldehyde are obtained in pure form.

3. 1000 grams of safrol are heated in a stirring-autoclave to 130-140° C. with 3 liters of a 25% methyl-alcoholic caustic potash solution. Then the methyl alcohol is distilled off and the residue dissolved in 4 liters of water. For removing the undecomposed safrol the aqueous solution is shaken with benzene. The benzene solution on distilling leaves about 30 grams of i-safrol.

The aqueous alkaline solution is mixed with 700 c. c. of conc. hydrochloric acid to neutralize the excess of alkali and then 800 grams of dimethyl sulfate are added in such a way that the temperature does not exceed 40° C. The methyl ether separates from the reaction product as an oil which may be siphoned off and washed with water. On distilling in vacuo the compound is obtained as a colorless oil boiling at 160-165° C. at a pressure of 13 mm. The output amounts to 900 grams. From the aqueous alkaline solution 100 grams of non-methylated product may be recovered by acidulating.

900 grams of the methyl ether are refluxed with 5.5 liters of alcohol, 2.6 liters of water and 4 c. c. of hydrochloric acid for 6 hours. Then the alcohol is distilled off, the residue absorbed in dilute caustic soda solution and the latter shaken with benzene to remove the non-saponified methyl ether. From the benzene solution about 20 grams of non-saponified methyl ether may be obtained.

The alkaline solution is acidulated, the precipitating phenols are absorbed in benzene, washed with water and dried. On distilling off the benzene 650 grams consisting of a mixture of mono-methyl ethers of 1-propenyl-3, 4-pyrocatechine are left.

50 grams of this mixture are crushed with 50 grams of caustic soda and 10 grams of water, and the salt thus obtained is oxidized according to example 2 by adding it to 150 grams of nitrobenzene. Hereupon the nitrobenzene and the aniline are blown off by steam, the residue from the distillation is washed with benzene for a second time, then acidulated and shaken with benzene. The benzene solution is exhausted with a bisulfite solution and by decomposing the latter with hydrochloric acid 220 grams of vanillin melting at 79-80° C. are obtained. The remaining benzene solution is freed from benzene and the residue distilled in vacuo. 18 grams of a distillate boiling at 145-155° (13 mm.) are obtained from which on cooling down i-chavibetol crystallizes out.

Of course the oxidation may be carried through after the separation not only of the i-chavibetol but also of the main quantity of the i-eugenol in form of its sodium salt.

4. 50 grams of safrol are heated in an autoclave with 200 grams of a 25% methyl-alcoholic caustic potash solution to 145-150° C. for about 18 to 20 hours. After cooling down the product is absorbed in a little water, the solution shaken with ether, the aqueous layer acidulated and the separated products are extracted with ether. The residue, remaining after the evaporation of the ether, is distilled in vacuo at 15 mm. and has then a boiling-point of 161-163° C.

50 grams of the resulting mixture of both methoxy-methyl ethers of propenyl-pyrocatechine are crushed with 45 grams of caustic soda and 15 grams of water. The oxidation of this salt is effected as above by introducing it into 150 grams of nitrobenzene. The excess of the nitrobenzene and the aniline is now blown off with steam and the residue from the distillation is once more washed with benzene. The aqueous alkaline solution is nearly neutralized by adding about 70 c. c. of hydrochloric acid of 1.12 specific gravity. Now 50 grams of dimethyl sulfate are added in portions whilst stirring and heating to 35-40° C. The methyl ethers separating in the form of an oil are absorbed in benzene and washed with dilute alkali solution, dried and distilled in vacuo. 26 grams of the distillate are saponified by boiling for 7 hours with 150 c. c. of alcohol, 75 c. c. of water and some drops of hydrochloric acid. Then the alcohol is distilled off, the remaining oil absorbed in ether, washed with water and the ethereal solution shaken out with a bisulfite solution. By decomposing the latter, i-vanillin melting at 114° is obtained.

The remaining ethereal solution is then extracted with a hot 15% caustic soda solution. From the alkaline extract sodium i-eugenolate crystallizes out on cooling down, from which on decomposing with dilute acid pure i-eugenol melting at 24° C. is obtained. The latter is subjected to oxidation according to example 1.

5. 100 grams of a mixture of the propenyl-pyrocatechine ethyl ethers produced in accordance with example 3, after being freed from the main quantity of the p-ether by freezing out, are crushed with 100 grams of caustic soda and 20 c. c. of water and the resulting salt is oxidized by introducing it into 300 grams of nitrobenzene. The working-up is accomplished in accordance with the foregoing example. 35 grams of the m-ethyl of protocatechuic aldehyde melting at 74-75° C. and 45 grams of the p-ethyl ether of 1-propenyl-3,4-pyrocatechine are obtained.

I claim:—

1. The process of producing aromatic ortho- and para-hydroxy-aldehydes which comprises oxidizing the alkali metal compounds of the corresponding propenyl derivatives with an excess of an aromatic nitro compound.

2. The process of producing aromatic ortho- and para-hydroxy-aldehydes which comprises oxidizing the alkali metal compounds of the corresponding propenyl derivatives with an excess of a nitro derivative of an aromatic hydrocarbon.

3. The process of producing aromatic ortho- and para-hydroxy-aldehydes which comprises oxidizing the alkali metal compounds of the corresponding propenyl derivatives with an excess of an aromatic nitro compound in the presence of a free alkali.

4. The process of producing aromatic ortho- and para-hydroxy-aldehydes which comprises oxidizing the alkali metal compounds of the corresponding propenyl derivatives with an excess of a nitro derivative of an aromatic hydrocarbon in the presence of a free alkali.

5. The process of producing aromatic ortho- and para-hydroxy-aldehydes which comprises oxidizing the alkali metal compounds of the corresponding propenyl derivatives with an excess of nitrobenzene.

6. The process of producing aromatic ortho- and para-hydroxy-aldehydes which comprises oxidizing the alkali metal compounds of the corresponding propenyl derivatives with an excess of nitrobenzene in the presence of a free alkali.

7. The process of producing aromatic ortho- and para-hydroxy-aldehydes which comprises oxidizing the wet alkali metal compounds of the corresponding propenyl derivatives with an excess of nitrobenzene.

8. The process of producing aromatic ortho- and para-hydroxy-aldehydes, which comprises oxidizing a mixture of the alkali metal compounds of aromatic m-propenyl-hydroxy-compounds and isomers, containing the propenyl group in another than the meta-position, with an excess of nitrobenzene and extracting the aldehydes from the resulting mixture of aldehydes and propenyl compounds.

9. The process of producing aromatic ortho- and para-hydroxy-aldehydes, which comprises oxidizing a mixture of the alkali metal compounds of aromatic m-propenyl-hydroxy-compounds and isomers, containing the propenyl group in another than the meta-position, with an excess of nitrobenzene and extracting the aldehydes from the resulting mixture of aldehydes and propenyl compounds with a bisulfite solution.

10. The process of producing aromatic para-hydroxy-aldehydes which comprises oxidizing a mixture of the alkali metal compounds of isomeric m- and p-propenyl-pyrocatechine mono-alkyl ethers with an excess of nitrobenzene and extracting the resulting m-alkyl ether of protocatechuic aldehyde.

11. The process of producing aromatic para-hydroxy-aldehydes which comprises oxidizing a mixture of the alkali metal compounds of isomeric m- and p-propenyl-pyrocatechine mono-methyl ethers with an excess of nitrobenzene and extracting the resulting vanillin.

12. The process of oxidizing only one of a mixture of metapropenyl phenol with a propenyl phenol containing the hydroxyl group on an other position to produce the corresponding aldehyde which consists in treating said mixture with an excess of nitrobenzene.

In testimony whereof I affix my signature.

FRIEDRICH BOEDECKER.